(12) United States Patent
Schmidt et al.

(10) Patent No.: US 9,910,339 B2
(45) Date of Patent: Mar. 6, 2018

(54) METHOD AND SYSTEM FOR LINEARIZING NON-LINEAR OPTICS

(71) Applicant: INSTITUT NATIONAL DE LA RECHERCHE SCIENTIFIQUE, Quebec (CA)

(72) Inventors: Bruno Schmidt, Montreal (CA); François Légaré, St-Eustache (CA); Matteo Clerici, Verdun (CA); Heide Ibrahim, Montreal (CA)

(73) Assignee: INSTITUT NATIONAL DE LA RECHERCHE SCIENTIFIQUE, Quebec (CA)

(*) Notice: Subject to any disclaimer, the term of this patent is extended or adjusted under 35 U.S.C. 154(b) by 41 days.

(21) Appl. No.: 14/785,018

(22) PCT Filed: Jun. 25, 2014

(86) PCT No.: PCT/CA2014/050607
§ 371 (c)(1),
(2) Date: Oct. 16, 2015

(87) PCT Pub. No.: WO2014/205573
PCT Pub. Date: Dec. 31, 2014

(65) Prior Publication Data
US 2016/0103384 A1  Apr. 14, 2016

Related U.S. Application Data

(60) Provisional application No. 61/839,656, filed on Jun. 26, 2013.

(51) Int. Cl.
*G02F 1/35* (2006.01)
*G02F 2/02* (2006.01)
*H01S 3/00* (2006.01)

(52) U.S. Cl.
CPC .......... *G02F 1/3501* (2013.01); *H01S 3/0092* (2013.01); *G02F 2001/3503* (2013.01); *G02F 2001/3528* (2013.01); *H01S 3/0057* (2013.01)

(58) Field of Classification Search
CPC .............................. G02F 1/3501; H01S 3/0092
See application file for complete search history.

(56) References Cited

U.S. PATENT DOCUMENTS 5,048,029 A * 9/1991 Skupsky .................... G02F 1/37
                                                                                                                372/102
5,710,658 A * 1/1998 Jacobson .................. G02B 5/04
                                                                                                                359/328

(Continued)

FOREIGN PATENT DOCUMENTS

EP      2821848 A1   1/2015
WO   2013023301 A1   2/2013

OTHER PUBLICATIONS

Chichkov, et al., "Spatially dispersive regenerative amplification of ultrashort laser pulses", Optics Express, 2009 (Dec. 21), pp. 24075-24083, vol. 17 No. 26.

(Continued)

*Primary Examiner* — Rhonda Peace
(74) *Attorney, Agent, or Firm* — Gwendoline Bruneau

(57) ABSTRACT

A method and a system for nonlinear optical interaction in a nonlinear medium, comprising interacting at least one input beam in a nonlinear medium located at a spectrally dispersed plane. The method and system allows generating output photons from input photons, the output photons having properties that linearly depend on the properties of the input photons and that are mutually independent, comprising interacting the input photons in a nonlinear medium located at a spectrally dispersed plane.

19 Claims, 2 Drawing Sheets

(56) References Cited

U.S. PATENT DOCUMENTS

| | | | |
|---|---|---|---|
| 6,288,832 B1 | 9/2001 | Richman et al. | |
| 7,256,885 B2* | 8/2007 | Silberberg | G01N 21/65 356/301 |
| 7,450,618 B2* | 11/2008 | Dantus | G01N 21/6402 250/281 |
| 7,567,596 B2* | 7/2009 | Dantus | G01J 11/00 250/281 |
| 7,609,731 B2* | 10/2009 | Dantus | G01N 21/4795 372/22 |
| 8,208,504 B2* | 6/2012 | Dantus | G01N 21/6402 250/281 |
| 8,760,661 B2* | 6/2014 | Cui | H01S 3/10 356/450 |
| 2003/0147122 A1 | 8/2003 | Jovanovic et al. | |
| 2007/0018103 A1* | 1/2007 | DeCamp | G01J 3/4338 250/339.06 |
| 2012/0195333 A1 | 8/2012 | Huang et al. | |
| 2013/0250982 A1* | 9/2013 | Zhang | H01S 3/10 372/21 |
| 2014/0219300 A1* | 8/2014 | Schimidt | G02F 1/39 372/25 |
| 2015/0023375 A1* | 1/2015 | Miyanaga | H01S 3/1307 372/25 |
| 2016/0103384 A1* | 4/2016 | Schmidt | G02F 1/3501 359/326 |

OTHER PUBLICATIONS

Danailov, et al., "A Novel Method of Ultrabroadband Laser Generation", Optics Communications, 1989 (Oct. 1), pp. 235-238, vol. 73 No. 3.

Dinev, et al., "Dispersion-free amplification of femtosecond dye-laser pulses", Optics Letters, 1992 (Sep. 15), pp. 1298-1300, vol. 17 No. 18.

Faure, et al., "A spatially dispersive regenerative amplifier for ultrabroadband pulses", Optics Communications, 1999 (Jan. 1), pp. 68-73, vol. 159.

Hauri, et al., "Generation of 14.8-fs pulses in a spatially dispersed amplifier", Optics Letters, 2004 (Jan. 15), pp. 201-203, vol. 29 No. 2.

* cited by examiner

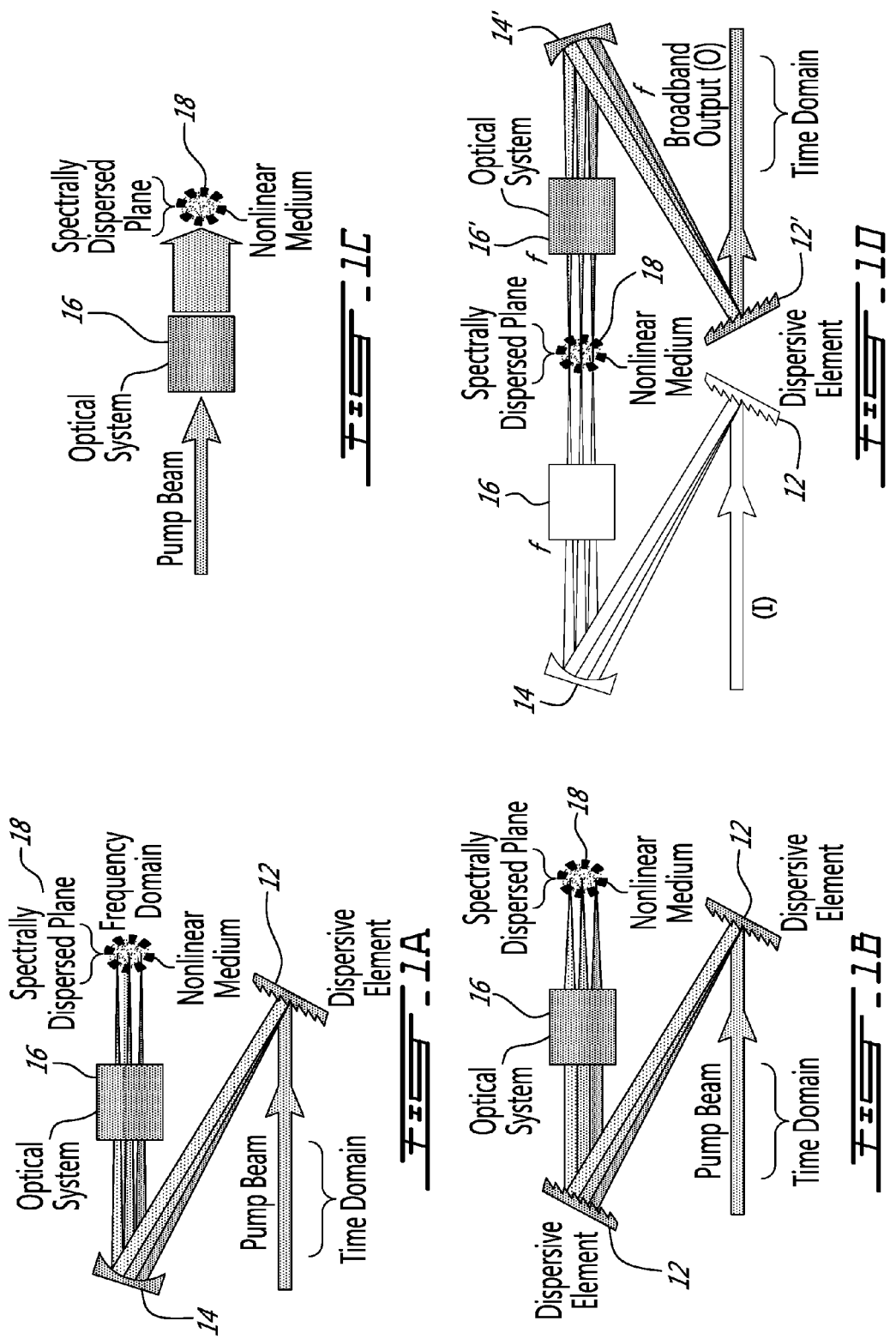

METHOD AND SYSTEM FOR LINEARIZING NON-LINEAR OPTICS

CROSS-REFERENCE TO RELATED APPLICATIONS

This application is a National Entry Application of PCT application no CA2014/050607 filed on Jun. 25, 2014 and published in English under PCT Article 21(2) as WO 2014/205573, which itself claims benefit of U.S. provisional application Ser. No. 61/839,656, filed on Jun. 26, 2013. All documents above are incorporated herein in their entirety by reference.

BACKGROUND OF THE INVENTION

In nonlinear optics, the basic role of any material medium is to act as a coupler between incoming light waves that would not interact otherwise, i.e. in vacuum or in the case of weak fields.

Such interaction gives rise to radiation of new light fields whose properties, such as frequency, amplitude and phase, may differ from the incoming fields. The relation, however, between in- and out-going light fields properties is in general not linear. Furthermore, the light field properties themselves, such as frequency, amplitude and phase, are interdepend and cannot be controlled independently.

On a microscopic level, physical limitations of nonlinear optical interaction arise from the dispersion properties of matter, such as, for instance, the frequency dependent speed of light in dielectric media or the phonon lifetime in solids. For many nonlinear processes to be efficient, it is a necessary condition that all interacting light pulses are phase matched, i.e. that they have the same phase velocity and the same group velocity. Satisfaction of the latter becomes more and more difficult the shorter the pulses get or the broader their spectra are, respectively.

Currently in the art, ways to minimize phase matching problems include: i) reducing the length of the dispersive medium, which typically reduces the efficiency of the process, ii) changing the angle of interaction, iii) modifying the pulse fronts of interacting beams, and iv) using periodically poled crystals. All these methods take place in the time domain.

Another fundamental limit for nonlinear interaction is given by the damage threshold of the material medium employed. To overcome this problem and avoid material damage, i) the beam size may be increased or ii) the pulses may be stretched in time, to lower the peak intensity. Enlarging beam sizes is limited by the availability of large aperture optics such as for instance nonlinear laser crystals.

A number of publications deal with performing light amplification in a spatially dispersed plane (SDP) [1-5]. They all involve real level pumped gain media, i.e. stimulated emission from a population inverted medium, to amplify ultrashort pulses that have been previously generated by other means. In other words, in these cases the SDP is seeded with photons and the properties, i.e. frequency and phase of these photons, are preserved, the interaction only causing an increase in their number. These amplification systems are said to be linear.

There is still a need in the art for a method and a system for modifying photon properties through nonlinear optical processes.

SUMMARY OF THE INVENTION

More specifically, in accordance with the present invention, there is provided a method of nonlinear optical interaction in a nonlinear medium, comprising interacting at least one input beam in a nonlinear medium located at a spectrally dispersed plane.

There is further provided a method for ultra-broadband phase conjugation, comprising interacting at least one input beam in a nonlinear medium located at a spectrally dispersed plane.

There is further provided a method of supercontinuum generation, comprising interacting at least one input beam in a nonlinear medium located at a spectrally dispersed plane.

There is further provided a system for nonlinear interaction of a beam of ultrashort pulses.

There is further provided a method for generating output photons from input photons, the output photons having properties that linearly depend on the properties of the input photons and that are mutually independent, comprising interacting the input photons in a nonlinear medium located at a spectrally dispersed plane.

There is further provided a method for arbitrary phase transfer from input photons to output photons, comprising interacting the input photons in a nonlinear medium located at a spectrally dispersed plane.

There is further provided a method for converting arbitrary spectral amplitude shapes of input photons to output photons, comprising interacting the input photons in a nonlinear medium located at a spectrally dispersed plane.

Other objects, advantages and features of the present invention will become more apparent upon reading of the following non-restrictive description of specific embodiments thereof, given by way of example only with reference to the accompanying drawings.

DESCRIPTION OF EMBODIMENTS OF THE INVENTION

Figure 1E:
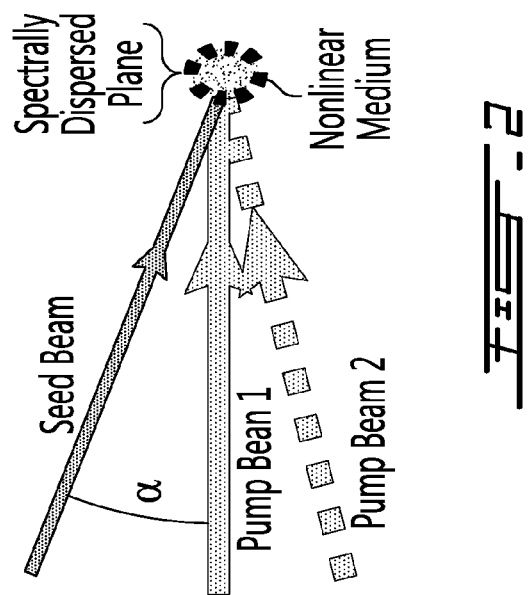
FIG. 1 show a) and b) time domain pump beam dispersion systems prior to the nonlinear interaction in the frequency domain at the SDP; c) a system for non-dispersed pump beam, prior to the nonlinear interaction in the nonlinear medium at the SDP either in the frequency or in the time domain, d) and e) beam propagation after nonlinear interactions in the frequency domain with the nonlinear medium at the SDP, according to embodiments of aspects of the present invention.

Generally speaking, in the field of nonlinear optics the nonlinear interaction of light and matter is often viewed in the time domain and experiments are carried out in the time domain of the ultrashort pulses.

The time domain can be transferred to the frequency domain by using optical Fourier transformation. Among others, one way to realize a Fourier transformation experimentally is to use a so called 4-f system.

As illustrated in FIG. 1d, an incoming beam (I) is dispersed by a dispersive element 12. Then the frequencies are collimated by a collimating optic 14. An optional optical system 16 may be used as mentioned hereinbelow. After this first Fourier transformation, the nonlinear interaction takes place in a nonlinear medium 18 in the frequency domain. Subsequent to this frequency domain nonlinear interaction, elements 14', 12', and optionally 16', symmetric to elements 14, 12, and optionally 16, of the input side, can provide a second optical Fourier transformation to get the laser pulses back into the time domain (see output beam (O)). If the distances between dispersive element 12, 12' and collimating optic 14, 14', and between the collimating optic 14, 14' and the SDP 16 equals the focal length (f) of the collimating optic 14, 14', the system is generally referred to as a 4f setup.

Temporally ultrashort pulses are composed of spectral components that may span up to one octave of frequencies or even more. These frequencies can be spatially separated next to each other in a nonlinear medium located in the SDP, as shown FIGS. 1a and 1b.

In some specific cases the SDP may be viewed as the frequency domain of the corresponding time domain pulses. FIG. 1a shows an optical Fourier transformation of input pulses from the time domain into the frequency domain and FIG. 1d shows the symmetric counterpart to recover time domain pulses.

Any other scheme that spectrally disperses ultrashort laser pulses can be used, i.e. an explicit Fourier transformation as performed in the system illustrated in FIG. 1a for example is not absolutely required. A system as illustrated in FIG. 1b, comprising multiple dispersive elements 12 in absence of a collimating optic 14 may be used instead. Plane gratings, curved gratings, prisms and grisms and a combination thereof may be used as dispersive elements 12. In FIGS. 1a-d, only gratings are used as dispersive elements 12 for illustrative purposes.

A number of dispersing elements 12 in sequence can be used, as illustrated for example in FIG. 1b. Their planes of dispersion can be parallel, perpendicular or have any angle between zero and ninety degrees.

The optical system 16, comprising lenses, mirrors or a combination thereof, may be used to tailor the SDP, i.e. for example to adjust the focal spot size in the SDP, and to vary the total expansion in the wavelengths spatially across the SDP, i.e. to modify the spacing between neighbouring frequencies, and to change the angle between different incident frequencies. As another example, if the collimating optic 14 is a spherical cylindrical optic that collimates the spectral components in the plane of drawing in FIG. 1a, the optical system may be used to focus the different frequencies in a plane perpendicular to the plane of drawing.

The nonlinear interaction can be performed in the vicinity of a Fourier plane such as the frequency plane as shown in FIG. 1a or in any other kind of SDP such as shown in FIG. 1b where the frequencies are spatially separated without being in a Fourier domain. More than one dispersive element may be used for the input beam, as shown in FIG. 1b. The dispersed spectral components may then be focused, by the optical system 16, to a point or to a line or remain unchanged. The spectral components may travel parallel to each other or at an angle.

Figure 2:
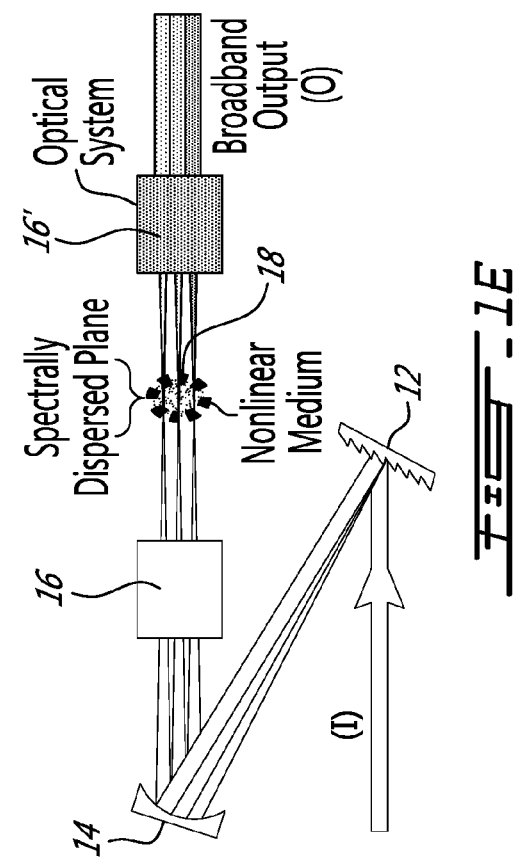
FIG. 2 shows different configurations of the seed beam and pump beam prior to the non nonlinear interaction in the nonlinear medium at the SDP according to embodiments of aspects of the present invention.

As schematically shown in FIG. 2, pump and optional seed beams may interact collinearly ($\alpha=0$) or non-collinearly ($\alpha \neq 0$) in the SDP. Pump and optional seed beams in the SDP may be applied co-propagating ($\alpha>0$), counter-propagating ($\alpha<0$) or at any other intersecting angle.

A single beam or multiple beams can be applied in the SDP.

The SDP can be pumped with spectrally undispersed pump beams, as shown in FIG. 1c. In FIG. 1c, the input beam is incident on a nonlinear crystal 18 located in an SDP.

The SDP can be pumped with spectrally dispersed pump beams, as shown in FIGS. 1a and 1b.

The nonlinear interaction in the SDP may be unseeded and only pumped by either spectrally undispersed or dispersed beams, as illustrated in FIGS. 1c, and 1a or 1b respectively.

Subsequent to the SDP, different spectral components may travel along different optical paths, passing dispersive optical elements 12' as shown for example in FIG. 1d.

The dispersive elements 12 on the input side may differ from the dispersive elements 12' on the output side. Additionally, the focal lengths (f) on the input and output sides may be different.

Subsequent to the SDP, different spectral components may travel along similar optical paths without using dispersive elements, as shown in FIG. 1e. These parallel spectral components may be focused to a single point subsequently.

The pump beam may be spatially modulated in amplitude or phase. The pump beam may contain narrow or broad frequency bands. The pump beam may be chirped in time or transform limited, i.e. different pump frequencies may arrive at different times or all at the same time, respectively.

The SDP can be pumped entirely or only partially. The SDP can be used to select different spectral components, i.e. to perform amplitude shaping by attenuation. Likewise, phase shifting of different spectral components with respect to each other may be applied with transmissive or reflective components. Among others, phase shaping may for instance be achieved by placing different glass plates of different thickness in the SDP.

The medium used for nonlinear interaction in the SDP may be a solid, a liquid, a gas or a plasma. It may be composed of one element, of multiple elements of the same kind, i.e. same cut and orientation in case of a nonlinear crystal for example, or of multiple elements of different kinds. In other words, different spectral components of the SDP may interact with different nonlinear media.

The nonlinear processes taking place in the SDP include but are not limited to: second-, third-, fourth-, . . . harmonic generation, sum frequency generation, difference frequency generation, optical rectification, parametric generation, Brillouin scattering, Raman scattering, three wave mixing, four wave mixing, phase conjugation, self phase modulation, cross phase modulation, THz generation. The present system and method may be used for ultra-broadband phase conjugation.

The SDP can be used to perform pump—probe experiments.

The nonlinear medium in the SDP can be used to annihilate light. For instance saturable absorption or multi-photon absorption can be used.

In the present method and system, the output pulses may have the same, a shorter or a longer time duration than the input pulses. For instance, second harmonic generation (SHG) might be driven in the SDP whereby the relative bandwidth of the SHG output beam remains the same than for the input beam at the fundamental frequency. The output pulses may thus be a factor of two shorter than the input pulses. In contrast, for time domain SHG the theoretical limit of pulse shorting via SHG equals the square root of 2.

In the present method and system, the output pulses may have the same spectral bandwidth, or a broader or a narrower spectral bandwidth. For instance, spectrally broadband parametric generation might be driven in the SDP by narrowband picosecond or nanosecond pulses. This broad spectrum may then be recombined into a single broadband beam by a system as shown in FIG. 1d for example. The present system and method may be used for supercontinuum generation with narrowband lasers.

The SDP containing the nonlinear medium can be placed inside a laser cavity such as an optical parametric oscillator. The nonlinear medium can also be a real level pumped lasing material (solid state, gas, fiber) placed inside an oscillator configuration. In these cases the nonlinear medium is used to generate laser emission in the frequency domain, not for amplification as known in the art.

In the present method and system, all nonlinear interactions take place in the frequency domain or a SDP. Prior to this nonlinear interaction there may be a first optical Fourier transformation or spectral dispersion, respectively. Subsequent to the nonlinear interaction, a Fourier transformation or spectral dispersion, respectively, may be used to provide time domain laser pulses.

The present method and system of performing nonlinear interaction in a SDP or frequency domain respectively, allow circumventing fundamental limitations of light matter interactions stemming from i) phase miss-match of interacting waves, i.e. light waves or matter waves, as well as ii) medium damage threshold. For instance, they allow for simultaneous increase of the spectral bandwidth and pulse energy. This paradox sounding situation arises because the output properties of the present system are no longer determined by the properties of the nonlinear medium employed. To upscale a given performance, one has to extend the SDP spatially because a larger area will reduce the risk of optical damage of the nonlinear medium. This reduces the incident power (energy/area) and phase matching bandwidth (spectrum/area).

If the aperture size of the nonlinear material is limited, multiple elements can be placed next to each other in a SDP without corrupting the output beam spatial properties.

If the phase matching bandwidth of the nonlinear medium is limited, multiple elements, i.e. a number of identical nonlinear crystals, can be placed next to each other in a SDP. Each element can be tuned to optimize its corresponding spectral slice. This enables to phase match a broader bandwidth compared to the use of a single nonlinear element in the time domain. Thus bandwidth limitations present in nonlinear optics may be circumvented.

The generated new photons have properties, i.e. amplitude, phase and frequency, which linearly depend on the properties of the photons prior to the nonlinear interaction. For instance, performing SHG in a SDP can transfer arbitrary phase functions from the fundamental to the SHG beam which is not possible in time domain interaction. This enables pulse compression at the second, third, fourth harmonic of a laser beam and it enables pulse shaping at the second, third, fourth harmonic of a laser beam.

The generated new photons have properties, i.e. amplitude, phase and frequency, which are mutually independent, i.e. either amplitude or phase or frequency can be each modified by nonlinear interaction in the SDP without changing another property. For instance, performing SHG in a SDP can transfer sharp spectral amplitude features of the fundamental input beam into the output beam at the second harmonic frequency. No other pulse parameters are affected. A time domain interaction would necessarily smoothen sharp spectral features upon SHG. To transfer sharp spectral features in time domain, theoretically, a huge amount of additional cubic phase function needs to be applied which temporally stretches the SHG pulse by many orders of magnitude.

Thus, the present method and system may be used for ultra-broadband frequency conversion. The present system and method may be used for pulse compression. The present system and method may be used for UV pulse shaping. The present system and method may be used for absorption spectroscopy.

The present method and system provide a generalization to nonlinear optical processes taking place in an SDP, whereby new photons are generated either with or without a seed beam.

The present method and system provide a generalization to nonlinear optical processes, whereby new photons are generated either with or without pumping.

The scope of the claims should not be limited by the embodiments set forth in the examples, but should be given the broadest interpretation consistent with the description as a whole.

REFERENCES

[1] M. Danailov and I. Christov, "Amplification of spatially-dispersed ultrabroadband laser pulses," Opt. Commun. 77, 396 (1990).
[2] S. Dinev, G. G. Paulus, W. Nicklich, and H. Walther, "Dispersion-free amplification of femtosecond dye-laser pulses," Opt. Lett. 17, 1298-1300 (1992).
[3] J. Faure, J. Itatani, S. Biswal, G. Chériaux, L. R. Bruner, G. C. Templeton, and G. Mourou, "A spatially dispersive regenerative amplifier for ultrabroadband pulses", Opt. Commun., 159, 68 (1999).
[4] C. P. Hauri, M. Bruck, W. Kornelis, J. Biegert, and U. Keller, "Generation of 14.8-fs pulses in a spatially dispersed amplifier," Opt. Lett. 29, 201 (2004).
[5] N. B. Chichkov, U. Bunting, D. Wandt, U. Morgner, J. Neumann, and D. Kracht, "Spatially dispersive regenerative amplification of ultrashort laser pulses," Opt. Exp. 17, 24075 (2009).

What is claimed is:

1. A method of nonlinear optical interaction in a nonlinear medium, comprising spectrally dispersing an input beam and interacting the dispersed beam in a nonlinear medium located at a spectrally dispersed plane, wherein said spectrally dispersing the input beam comprises performing a first Fourier transformation on the input beam, said interacting taking place in the frequency domain, the method further comprising performing a second Fourier transformation after said interacting to yield an output beam in the time domain.

2. The method of claim 1, comprising at least partly pumping the spectrally dispersed plane with a spectrally dispersed pump beam.

3. The method of claim 2, wherein the input beam is a beam of ultrashort pulses.

4. The method of claim 1, comprising at least partly pumping the spectrally dispersed plane with a spectrally dispersed pump beam, the input beam being a beam of ultrashort pulses, wherein said spectrally dispersing the beam comprises using multiple dispersive elements.

5. The method of claim 1, comprising at least partly pumping the spectrally dispersed plane with a spectrally dispersed pump beam, the input beam being a beam of ultrashort pulses, wherein said spectrally dispersing the beam comprises using multiple dispersive elements selected in the group consisting of plane gratings, curved gratings, prisms, grisms and a combination thereof.

6. The method of claim 1, comprising at least partly pumping the spectrally dispersed plane with a spectrally dispersed pump beam, the input beam being a beam of ultrashort pulses, wherein said spectrally dispersing the beam comprises using multiple dispersive elements, the dispersive elements having planes of dispersion that are one of: parallel, perpendicular, and at an angle between zero and ninety degrees.

7. The method of claim 1, comprising at least partly pumping the spectrally dispersed plane with a spectrally dispersed pump beam, the input beam being a beam of ultrashort pulses, further comprising tailoring the spectrally dispersed plane by using an optical system.

8. The method of claim 1, comprising at least partly pumping the spectrally dispersed plane with a spectrally dispersed pump beam, the input beam being a beam of ultrashort pulses, further comprising tailoring the spectrally dispersed plane by using an optical system, said tailoring comprising one of: i) adjusting the focal spot size in the spectrally dispersed plane, ii) varying a total expansion in wavelengths spatially across the spectrally dispersed plane, and iii) changing an angle between different incident frequencies.

9. The method of claim 1, comprising at least partly pumping the spectrally dispersed plane with a spectrally dispersed pump beam, the input beam being a beam of ultrashort pulses, further comprising tailoring the spectrally dispersed plane by using an optical system selected in the group consisting of lenses, mirrors or a combination thereof.

10. The method of claim 1, comprising at least partly pumping the spectrally dispersed plane with a spectrally dispersed pump beam, the input beam being a beam of ultrashort pulses, further comprising a spherical cylindrical optic that collimates the dispersed beam in a first plane and an optical system that focuses the different frequencies in a second plane perpendicular to the first plane.

11. The method of claim 1, comprising at least partly pumping the spectrally dispersed plane with a spectrally dispersed pump beam, the input beam being a beam of ultrashort pulses, further comprising focusing dispersed spectral components to a point or a line.

12. The method of claim 1, comprising at least partly pumping the spectrally dispersed plane with a spectrally undispersed pump beam.

13. The method of claim 1, comprising placing the spectrally dispersed plane inside a laser cavity.

14. The method of claim 1, wherein the nonlinear medium located at the spectrally dispersed plane is a real level pumped lasing material placed inside an oscillator.

15. The method of claim 1, wherein an output spectrum after said interacting in the nonlinear medium located at the spectrally dispersed plane is larger than the input spectrum.

16. The method of claim 1, wherein the nonlinear optical interaction is one of: second-, third-, fourth-, . . . harmonic generation, sum frequency generation, difference frequency generation, optical rectification, parametric generation, Brillouin scattering, Raman scattering, three wave mixing, four wave mixing, phase conjugation, self phase modulation, cross phase modulation and THz generation.

17. A method of ultra-broadband phase conjugation, comprising spectrally dispersing an input beam and interacting the dispersed beam in a nonlinear medium located at a spectrally dispersed plane, wherein said spectrally dispersing the input beam comprises performing a first Fourier transformation on the input beam, said interacting taking place in the frequency domain, the method further comprising performing a second Fourier transformation after said interacting to yield an output beam in the time domain.

18. A system for non linear interaction of a beam of ultrashort pulses, comprising:
 a first dispersive stag, performing a first Fourier transformation on an input beam;
 a nonlinear medium, located at the spectrally dispersed plane, for interaction with the dispersed beam in the frequency domain; and
 a second dispersive stage, performing a second Fourier transformation yielding an output beam in the time domain.

19. The system of claim 18, further comprising an optical system before the nonlinear medium.

* * * * *